United States Patent
Maier

(10) Patent No.: US 8,446,041 B2
(45) Date of Patent: May 21, 2013

(54) NO BREAK POWER TRANSFER WITH SOLID STATE POWER CONTROLS

(75) Inventor: Josef Maier, Munningen (DE)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 325 days.

(21) Appl. No.: 12/834,183

(22) Filed: Jul. 12, 2010

(65) Prior Publication Data

US 2012/0007427 A1    Jan. 12, 2012

(51) Int. Cl.
*H02J 7/00* (2006.01)

(52) U.S. Cl.
USPC .............................................. 307/65; 307/9.1

(58) Field of Classification Search
USPC ..................................... 307/65, 9.1
See application file for complete search history.

(56) References Cited

U.S. PATENT DOCUMENTS

| | | | |
|---|---|---|---|
| 4,874,961 A | 10/1989 | Henderson | |
| 4,937,462 A | 6/1990 | Recker et al. | |
| 5,142,163 A | 8/1992 | Hase | |
| 5,317,500 A | 5/1994 | Iden et al. | |
| 5,729,059 A | 3/1998 | Kilroy et al. | |
| 6,657,416 B2 * | 12/2003 | Kern et al. | 322/29 |
| 6,806,589 B1 | 10/2004 | Suttie | |
| 6,992,403 B1 * | 1/2006 | Raad | 307/47 |
| 7,254,465 B2 * | 8/2007 | McGinley | 700/295 |
| 7,417,337 B1 | 8/2008 | Suttie | |
| 7,528,499 B2 | 5/2009 | Suttie | |
| 7,677,135 B2 | 3/2010 | Himmelmann | |
| 8,159,086 B2 * | 4/2012 | Karipides | 307/22 |
| 2004/0169421 A1 * | 9/2004 | Eaton et al. | 307/64 |
| 2008/0034256 A1 * | 2/2008 | Mosman | 714/43 |

\* cited by examiner

*Primary Examiner* — Robert L. Deberadinis
(74) *Attorney, Agent, or Firm* — Carlson, Gaskey & Olds, PC

(57) ABSTRACT

A method of controlling a power system provides at least two alternative sources of power delivering power to a power bus. Switches are provided between each of the at least two sources of power and the power bus. The bus is powered by a first of the at least two sources of power. A characteristic of the power supplied by the sources of power is monitored. Switching from the first source of power to a second source of power occurs by opening a switch associated with the first source of power, and closing the switch associated with the second source of power. The timing for performing the switching is selected such that one or more characteristics of the power supplied by the first and second sources of power are close to each other to minimize the apparent break in the power. A power system incorporate controls for effecting the method.

20 Claims, 5 Drawing Sheets

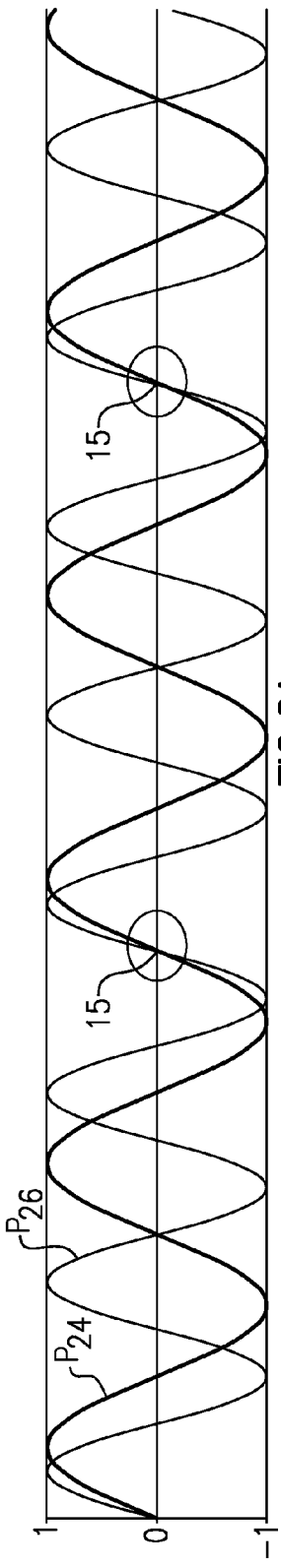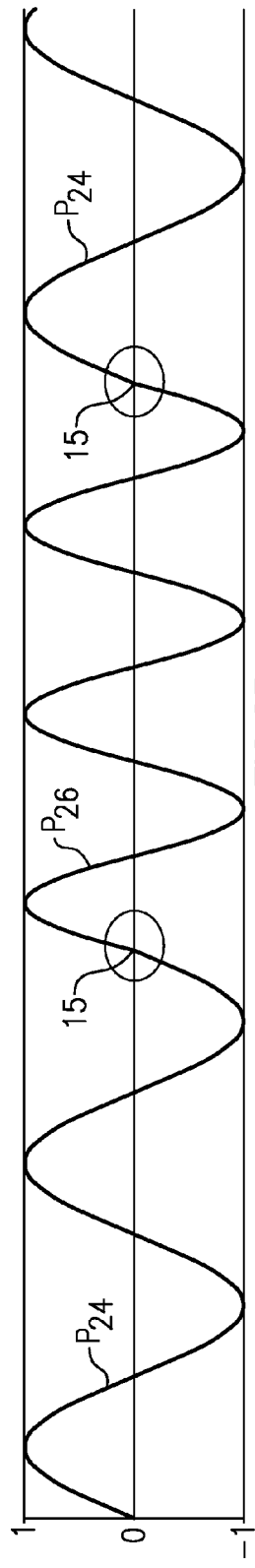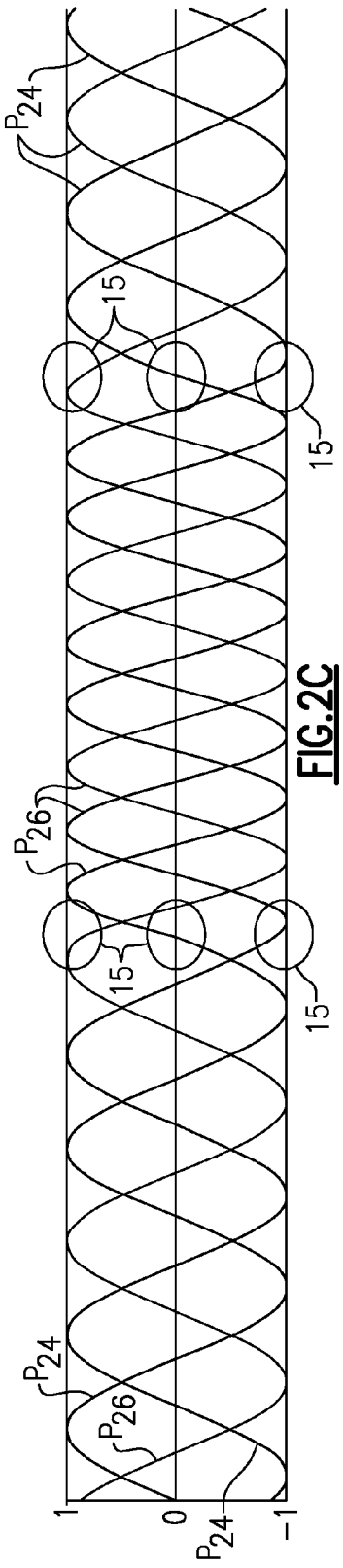

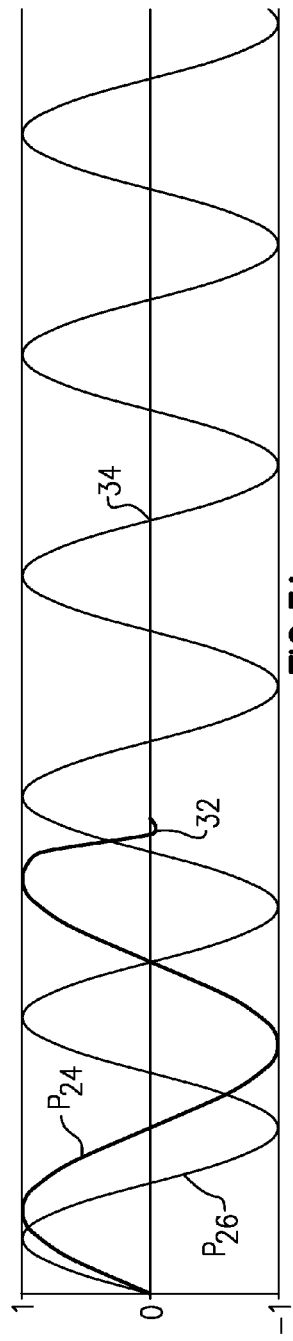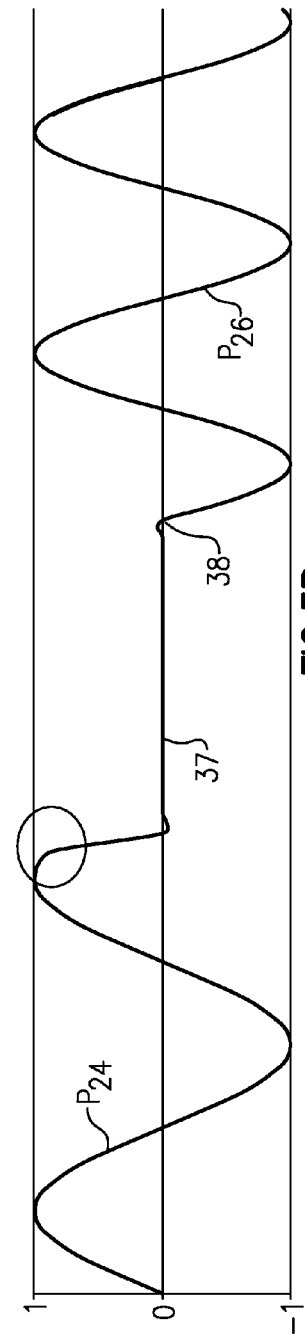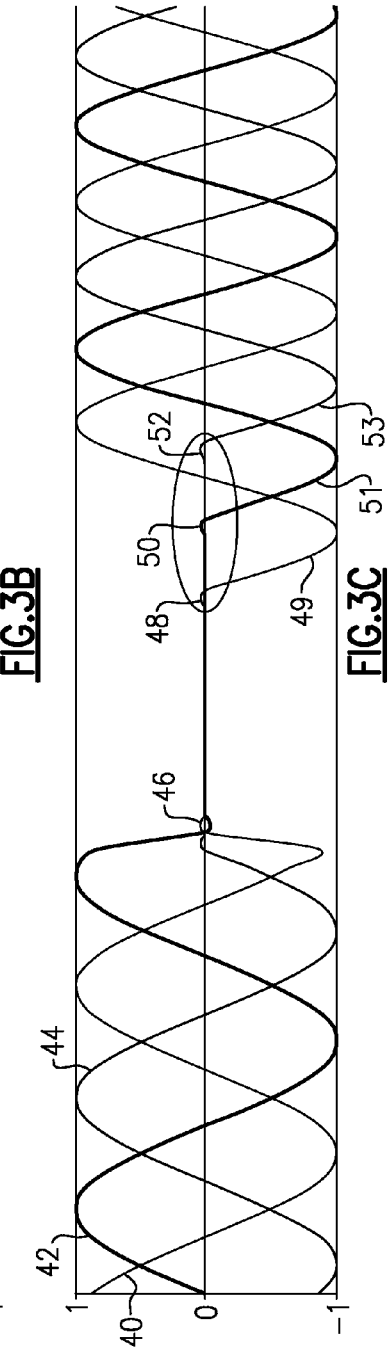

NO BREAK POWER TRANSFER WITH SOLID STATE POWER CONTROLS

BACKGROUND

This application relates to a power transfer between two power sources and an accessory bus, such as may be associated with an aircraft.

Modern aircraft typically power any number of applications. Generators generate power and deliver that power to power buses that run across the length of the aircraft. In addition, power is supplied for functions such as providing air, light, etc., to the aircraft cabin. This is but a short listing of potential components powered from the bus.

In modern aircraft, an auxiliary power unit (APU) includes a source of power, such as a small gas turbine engine, which drives a generator.

Gas turbine engines on the aircraft also drive generators, to produce electric power to be delivered to the bus. When the aircraft is on the ground, the main gas turbine engines have yet to be started, and are not delivering significant power. Instead, at that time, power is supplied by the APU. At some point, power is transferred to the bus by opening a switch associated with the APU, and closing a switch to deliver power from the main gas turbine engine generators.

Such a point in time is typically associated with an apparent break to the aircraft occupants. As an example, lights may flicker, air flow may stop momentarily, etc.

SUMMARY

A method of controlling a power system provides at least two alternative sources of power delivering power to a power bus. Switches are provided between each of the at least two sources of power and the power bus. The bus is powered by a first of the at least two sources of power. A characteristic of the power supplied by the sources of power is monitored. Switching from the first source of power to a second source of power occurs by opening a switch associated with the first source of power, and closing the switch associated with the second source of power. The timing for performing the switching is selected such that one or more characteristics of the power supplied by the first and second sources of power are close to each other to minimize the apparent break in the power supplied to the accessory bus.

A power system incorporating controls for effecting the method as described above is also disclosed and claimed.

These and other features of the present invention can be best understood from the following specification and drawings, the following of which is a brief description.

BRIEF DESCRIPTION OF THE DRAWINGS

FIG. 2A shows a first example of a switching operation.
FIG. 2B shows the result of the FIG. 2A switching.
FIG. 2C shows three phases of the FIG. 2B output.
FIG. 3A shows abnormal operation.
FIG. 3B shows a switching point.
FIG. 3C shows the switching of FIG. 3B across three phases.

DETAILED DESCRIPTION

Figure 1:
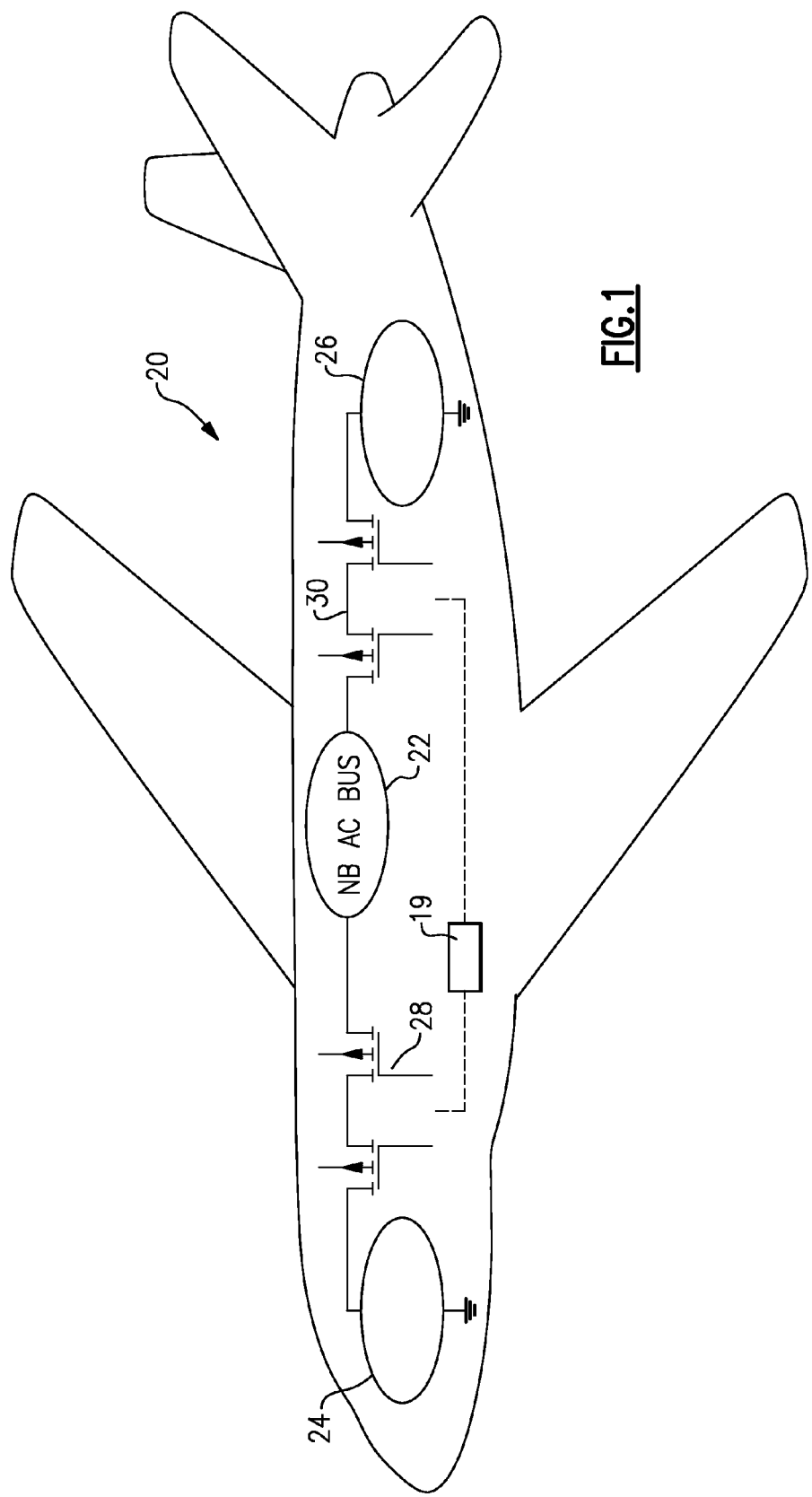
FIG. 1 schematically shows a power architecture for an aircraft.

FIG. 1 shows an aircraft 20 having a main AC power bus 22. A first source of power 24 delivers power through a solid state power controller (SSPC) 28 to the bus 22. A second power source 26 delivers power through a second solid state power controller 30 to the bus 22.

A control 19 selectively operates the SSPCs 28 and 30 to open or close to communicate the power sources 24 and 26 to the bus 22. The control 19 can include one or more microcontrollers, memory, input/output interfaces, and/or additional circuitry configured to achieve the referenced control functions. The power sources 24 and 26 may be gas turbine engines, and one may be an APU (for example 24), while the other (for example 26) may be a main gas turbine engine for the aircraft 20.

As mentioned above, as the aircraft 20 switches from APU power to the main gas turbine engine power, there is a noticeable break in continuity of delivered power.

FIG. 2A shows a control method which would be utilized by the control 19 to reduce or eliminate the break.

The SSPCs 28, 30 or control 19 can measure voltage, current and frequency from the two power sources 24 and 26.

Thus, as shown in FIG. 2A, a power wave is identified at $P_{24}$, and is provided by the power source 24, which may be the APU. The second wave $P_{26}$ is from the power source 26 associated with the main gas turbine engine.

When it is desired to switch from power being powered by the power source 24 to the power source 26, the control 19 compares their characteristics, and finds switching or sync points 15. These sync points 15 are utilized as a time to switch the SSPCs 28 and 30, and in particular to open the SSPC 28 and close the SSPC 30 such that power now flows to the bus 22 from the power source 26, and no longer from the power source 24. The power source 24 may be delivering at a different frequency than the power source 26. As an example only, power source 24 may deliver at 400 Hz, while power source 26 may deliver at 600 Hz.

The sync points can be identified in any number of ways. As one way, each of the SSPCs 28 and 30 would typically include a digital signal processor. This digital signal processor can identify analog values of the voltage, and typically do so on every short period of time. As an example, every 10 microseconds the voltage is identified. By sampling these voltages, the digital signal processors can identify a wave form for the voltages.

The control 19 can simply be an interaction between the digital signal processors in the two SSPCs, or could be a central control. In either case, the control 19 compares the two voltage wave signals from the SSPCs 28 and 30, and identifies whether they are rising and falling. A sync point is identified when each of the two signals is moving in the same direction (e.g. rising or falling) and the voltage levels will be the same. Of course, a common inflection point could also be used. It is at that point that the switch would typically occur.

As can be appreciated in FIG. 2B, the first sync point 15 can be provided with little or no break, and a second sync point 15 is indicative of a switch back to the source 24. Occupants of the aircraft, or other system incorporating such a control, would see little apparent interruption during the switching. In fact, there may be no interruption at all.

FIG. 2C shows the sync points as they would appear across three phases of power.

FIG. 3A shows abnormal operation, and in particular, a failure of the power source 24. Thus, as shown at point 32, the power source 24 has failed. The control 19 waits for the next zero switching or sync point 34 of the power source 26 and performs the switching at that point, which maintains the phase relationship when transitioning between power sources 24 and 26. Thus, as shown in FIG. 3B, the apparent overall control would have a short period of interruption of power 37 leading to the point 38 wherein the switch is made to the power source 26.

FIG. 3C shows the apparent result across three phases of power, and shows distinct switching points 48, 50 and 52 for switching from three failed waves 40, 42, and 44 to the three replacement waves 49, 51 and 53. Again, while looking for the zero switching or sync point, and waiting for that point to perform the switch, there is less apparent interruption at the switching.

It should be understood that the abnormal operation, or failure, could occur to either of the two power sources 24 and 26, and the switching can go in either direction between the two.

The above system is particularly useful for AC systems, and could be 115V, 230V, or other type systems. The SSPCs 28 and 30 provide fast, synchronized switching, and minimize any apparent interruption.

Figure 4:
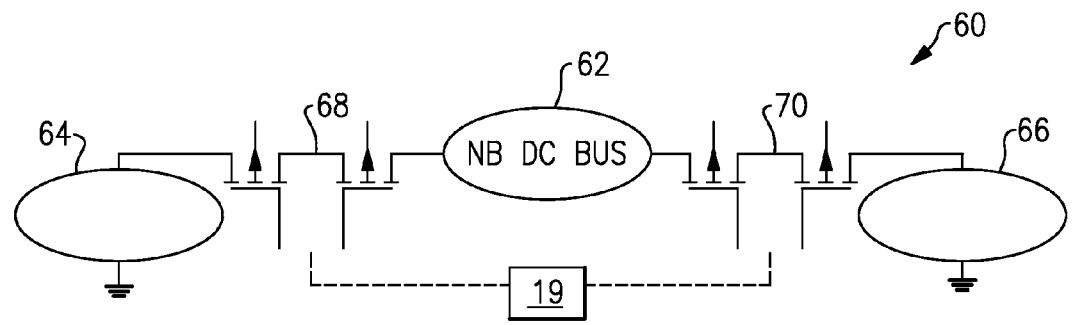
FIG. 4 shows a second embodiment.

FIG. 4 shows a DC system 60. Again, there are power sources 64 and 66 delivering power through solid state power controllers 68 and 70 to a DC bus 62. Control 19 controls SSPCs 68 and 70

Figure 5A:
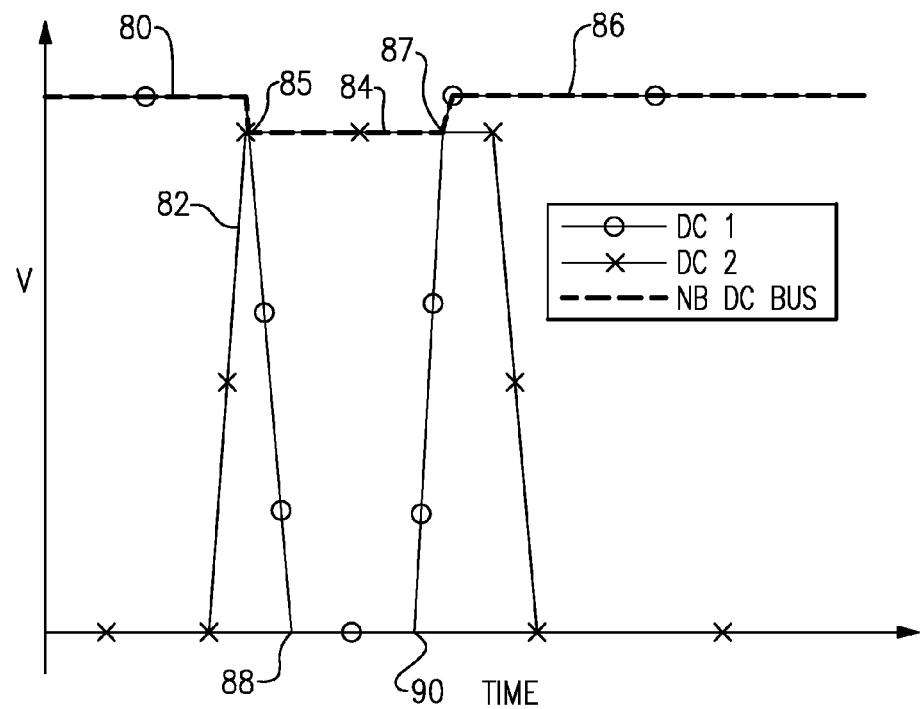
FIG. 5A shows normal switching operation.

As shown in FIG. 5A, during normal operation, the voltage of one power source 80 drops toward zero at point 88, and resumes at point 90 back up to 86. During the interim, the other power source 82 moves rapidly upwardly to 84. The control 19 looks for switching or sync points 85 and 87, and utilizes these switching points to switch between the two power sources 64, 66. While the switch back to the first power source is shown relatively rapidly in FIG. 5A, it can of course be spaced by much greater lengths of time.

The identification of the sync points in this DC embodiment would be simpler than in the AC embodiment. Here all that is necessary is to identify the level of voltage, and the control need not identify whether that constant voltage would be rising or falling. Again, the digital signal processor typically incorporated into the SSPCs 68 and 70 can operate as mentioned above in the AC embodiment.

Figure 5B:
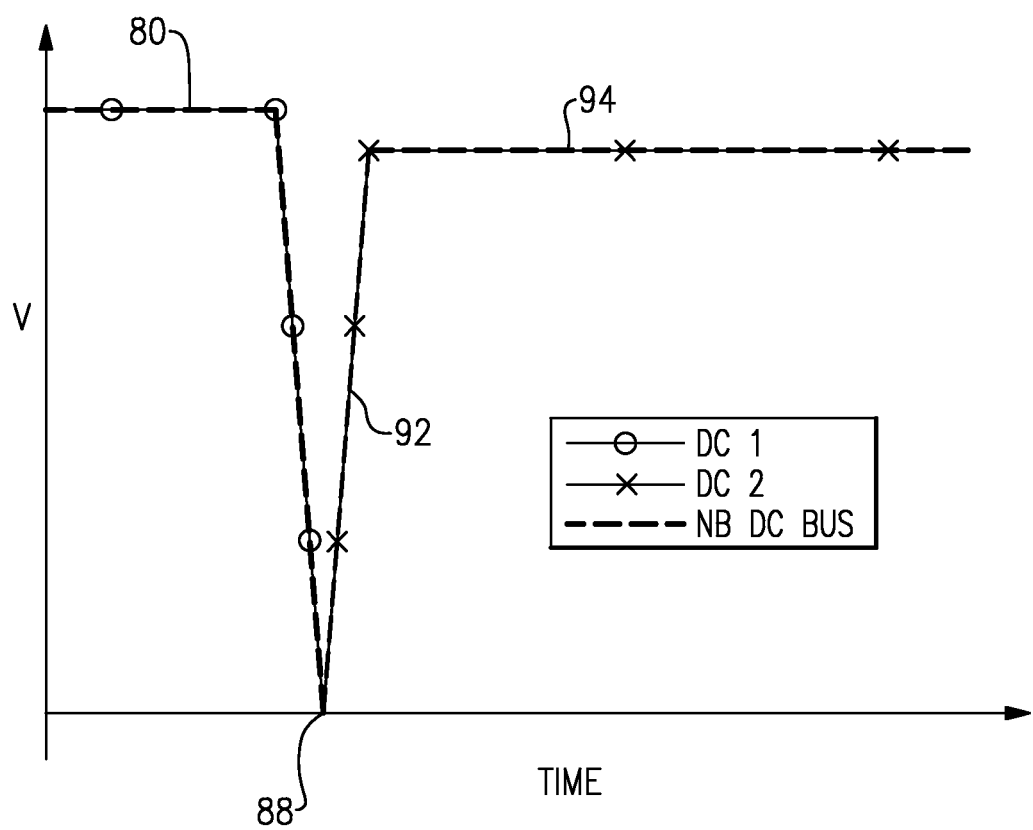
FIG. 5B shows abnormal operation.

FIG. 5B shows a failure of one power source 80, moving downwardly to a break point 88. The second power source ramps rapidly upwardly at 92 from the break point 88 to a steady state at 94. The break point 88 need not be zero volts depending on the reaction time of the DC system 60.

There may be any number of reasons for switching between the two DC power sources 64, 66 of the DC system 60. It is the control method of looking for a switching or sync point, and waiting for that point to occur to perform the switching that provides minimizes the apparent interruption.

While the switching is shown at the exact synchronization point in this application and drawings, it should be understood that all that is required is for the switching to occur at a point that approaches close synchronization for the apparent interruption to be minimized.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of controlling a power system comprising the steps of:
   (a) providing at least two alternative sources of power for delivering power to a power bus;
   (b) providing switches between each of said at least two sources of power and said power bus;
   (c) powering said power bus with a first of said at least two sources of power, and monitoring a characteristic of the power supplied by each of said at least two sources of power, and switching from said first source of power to a second of said at least two sources of power by opening a switch associated with said first source of power, and closing a switch associated with said second source of power, and the switching being performed at a point such that said monitored characteristics of the power supplied by said first and second sources of power are close to each other to minimize an apparent break in the power supplied to the power bus.

2. The method as set forth in claim 1, wherein the point of switching is selected such that the two sources of power are synchronized.

3. The method as set forth in claim 2, wherein the power system is an AC power system, and the monitored characteristic includes one or more of voltage and current.

4. The method as set forth in claim 3, wherein said first and second power sources provide distinct frequencies of power.

5. The method as set forth in claim 3, wherein the switching is performed as a normal operation to switch between two sources of power, and sync points of the power provided by said first and second sources of power are selected as the point at which to switch.

6. The method as set forth in claim 5, wherein said at least two sources of power include an auxiliary power unit and a main gas turbine engine on an aircraft.

7. The method as set forth in claim 2, wherein the power system is a DC power system, and the monitored characteristic includes voltage.

8. The method as set forth in claim 1, wherein the point of switching occurs with a fault of at least one of said first and second sources of power, and the switching occurs at a zero switching or sync point of the second source of power.

9. The method as set forth in claim 1, wherein the first source of power delivers a higher voltage than the second source of power, and the switching occurs as said first source of power drops across the voltage level provided by said second source of power.

10. The method as set forth in claim 1, wherein said first source of power is a faulted DC power source, and said switching point to said second source of power is initiated at zero voltage as said first source of power approximates a voltage supply of zero.

11. A power system comprising:
    at least two alternative sources of power for delivering power to a power bus;
    switches between each of said at least two sources of power and said power bus;
    a control powering said power bus with a first of said at least two sources of power, and monitoring a characteristic of the power supplied by each of said at least two sources of power, and switching from said first source of power to a second of said at least two sources of power by opening a switch associated with said first source of power, and closing a switch associated with said second source of power, and the switching being performed at a point such that said monitored characteristics of the power supplied by said first and second sources of power are close to each other to minimize an apparent break in the power supplied to the power bus.

12. The system as set forth in claim 11, wherein the control selects a point of switching when the first and second sources of power are synchronized.

13. The system as set forth in claim 12, wherein the power system is an AC power system, and the monitored characteristic includes one or more of voltage and current.

14. The system as set forth in claim 13, wherein the switching is performed as a normal operation to switch between two sources of power, and sync points of the power provided by said first and second sources of power are selected as the switching point.

15. The system as set forth in claim 13, wherein said at least two sources of power include an auxiliary power unit (APU) and a main gas turbine engine on an aircraft.

16. The system as set forth in claim 15, wherein said APU and said main gas turbine engine power generators which provide two distinct frequencies of power.

17. The system as set forth in claim 11, wherein the power system is a DC power system, and the monitored characteristic includes voltage.

18. The method as set forth in claim 11, wherein the point of switching occurs with a fault of at least one of said first and second sources of power, and the switching occurs at a zero switching or sync point of the second source of power.

19. The method as set forth in claim 11, wherein the first source of power delivers a higher voltage than the second source of power, and the switching occurs as said first source of power drops across the voltage level provided by said second source of power.

20. The method as set forth in claim 11, wherein said first source of power is a faulted DC power source, and said switching point to said second source of power is initiated at zero voltage as said first source of power approximates a voltage supply of zero.

* * * * *